(12) United States Patent
Matsushita et al.

(10) Patent No.: US 10,074,854 B2
(45) Date of Patent: Sep. 11, 2018

(54) ANODE ACTIVE MATERIAL AND ALL SOLID SECONDARY BATTERY

(71) Applicant: TOYOTA JIDOSHA KABUSHIKI KAISHA, Toyota-shi, Aichi-ken (JP)

(72) Inventors: Yuki Matsushita, Atsugi (JP); Satoshi Yoshida, Susono (JP); Koichi Sugiura, Susono (JP); Hisataka Fujimaki, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 37 days.

(21) Appl. No.: 15/094,496

(22) Filed: Apr. 8, 2016

(65) Prior Publication Data

US 2016/0315353 A1 Oct. 27, 2016

(30) Foreign Application Priority Data

Apr. 27, 2015 (JP) .................. 2015-090473

(51) Int. Cl.
| | | |
|---|---|---|
| *H01M 4/133* | (2010.01) | |
| *H01M 4/36* | (2006.01) | |
| *H01M 4/587* | (2010.01) | |
| *H01M 4/62* | (2006.01) | |
| *H01M 10/0525* | (2010.01) | |
| *H01M 10/0562* | (2010.01) | |

(52) U.S. Cl.
CPC .......... *H01M 4/366* (2013.01); *H01M 4/133* (2013.01); *H01M 4/587* (2013.01); *H01M 4/62* (2013.01); *H01M 10/0525* (2013.01); *H01M 10/0562* (2013.01)

(58) Field of Classification Search
CPC ........ H01M 4/366; H01M 4/62; H01M 4/587; H01M 4/133; H01M 10/0525; H01M 10/0562

See application file for complete search history.

(56) References Cited

U.S. PATENT DOCUMENTS

| | | | |
|---|---|---|---|
| 2004/0048154 A1* | 3/2004 | Jung | ............... H01M 4/136 |
| | | | 429/212 |
| 2014/0234714 A1* | 8/2014 | Cho | ............... H01M 4/366 |
| | | | 429/220 |
| 2014/0356709 A1 | 12/2014 | Arikawa et al. | |
| 2015/0311507 A1 | 10/2015 | Miki et al. | |
| 2016/0118652 A1* | 4/2016 | Wu | ............... H01M 4/364 |
| | | | 429/213 |

FOREIGN PATENT DOCUMENTS

| | | |
|---|---|---|
| JP | 2003-059492 A | 2/2003 |
| JP | 2008-027581 A | 2/2008 |
| JP | 2009-176703 A | 8/2009 |
| JP | 2014-146507 A | 8/2014 |
| KR | 2015-0018562 A | 2/2015 |

* cited by examiner

*Primary Examiner* — Cynthia K Walls
(74) *Attorney, Agent, or Firm* — Oliff PLC

(57) ABSTRACT

A main object of the present invention is to provide an anode active material capable of enhancing improvement of heat resistance in an all solid secondary battery. The present invention solves the problem by providing an anode active material comprising an active material particle having carbon as a main component, and a coating layer containing $Li_xPO_y$, ($2 \leq x \leq 4$, $3 \leq y \leq 5$) and formed on a surface of the active material particle.

4 Claims, 2 Drawing Sheets

ANODE ACTIVE MATERIAL AND ALL SOLID SECONDARY BATTERY

TECHNICAL FIELD

The present invention relates to an anode active material capable of intending to improve heat resistance in an all solid secondary battery.

BACKGROUND ART

In accordance with a rapid spread of information relevant apparatuses, communication apparatuses and the like, such as a personal computer, a video camera and a portable telephone in recent years, the development of a battery excellent as a power source thereof has been emphasized. Also, in the field except information relevant apparatuses and communication relevant apparatuses, the development of a lithium ion battery has been advanced as a battery to be used for an electric automobile and a hybrid automobile in the automobile industry, for example.

A lithium battery generally has a cathode active material layer containing a cathode active material, an anode active material layer containing an anode active material, and an electrolyte layer formed between the cathode active material layer and the anode active material layer.

As an anode active material, for example, an anode active material containing a carbon active material, in which the surface of a carbon substance is coated with amorphous carbon, and an organic compound having an ionizable group and an aromatic ring is disclosed in Patent Literature 1. Also, an anode, in which the surface of an active material layer containing particles including Si or Sn is coated with a polymer, is disclosed in Patent Literature 2. Both of Patent Literatures 1 and 2 relate to the anode active material and the anode to be used for a liquid battery.

Liquid electrolyte containing a flammable organic solvent is used for a presently commercialized lithium battery, so that the installation of a safety device for restraining temperature rise during a short circuit and the structure for preventing the short circuit are necessary therefor. On the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery. In addition, among all solid state batteries, an all solid state battery using a sulfide solid electrolyte material has the advantage that Li ion conductivity is excellent.

CITATION LIST

Patent Literatures

Patent Literature 1: Japanese Patent Application Laid-Open No.2014-146507
Patent Literature 2: Japanese Patent Application Laid-Open No.2009-176703

SUMMARY OF INVENTION

Technical Problem

The improvement of heat resistance in an all solid secondary battery is demanded from the viewpoint of improving safety.

The present invention has been made in view of the actual circumstances, and the main object thereof is to provide an anode active material capable of intending to improve heat resistance in an all solid secondary battery, and the all solid secondary battery using the anode active material.

Solution to Problem

To achieve the object, the present invention provides an anode active material comprising an active material particle having carbon as a main component, and a coating layer containing $Li_xPO_y$ ($2 \leq x \leq 4$, $3 \leq y \leq 5$) and formed on a surface of the active material particle.

According to the present invention, the anode active material capable of improving heat resistance of an all solid secondary battery may be obtained when the anode active material contains a coating layer containing $Li_xPO_y$ ($2 \leq x \leq 4$, $3 \leq y \leq 5$).

Also, the present invention provides an all solid secondary battery comprising a cathode active material layer containing a cathode active material, an anode active material layer containing an anode active material, and a solid electrolyte layer containing a sulfide solid electrolyte material and formed between the cathode active material layer and the anode active material layer wherein the anode active material is the anode active material described above.

According to the present invention, the all solid secondary battery with improved heat resistance may be obtained when the anode active material layer contains the anode active material described above.

Advantageous Effects of Invention

The anode active material of the present invention produces the effect such as to allow the improvement of heat resistance in an all solid secondary battery to be intended.

DESCRIPTION OF EMBODIMENTS

An anode active material and an all solid secondary battery of the present invention are hereinafter described in detail.

A. Anode Active Material

Figure 1:
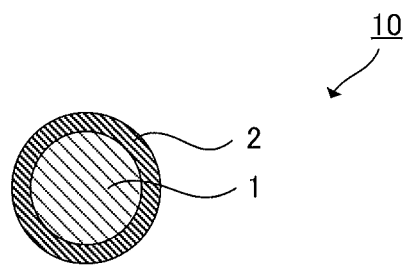
FIG. 1 is a schematic cross-sectional view showing an example of an anode active material of the present invention.

FIG. 1 is a schematic cross-sectional view showing an example of an anode active material of the present invention. An anode active material 10 shown in FIG. 1 comprises an active material particle 1 having carbon as the main component, and a coating layer 2 containing $Li_xPO_y$ ($2 \leq x \leq 4$, $3 \leq y \leq 5$) and formed on the surface of the active material particle 1.

According to the present invention, heat resistance in an all solid secondary battery may be improved by having a coating layer containing $Li_xPO_y$ ($2 \leq x \leq 4$, $3 \leq y \leq 5$).

Specifically, the anode active material of the present invention allows an exothermic peak caused by a reaction between the active material particle (carbon) and a sulfide solid electrolyte material to be shifted to the high-temperature side by having the coating layer described above. In other words, a temperature at which the reaction between the active material particle and a sulfide solid electrolyte material is caused may be shifted to the high-temperature side. Therefore, the anode active material of the present invention may improve safety of an all solid secondary battery at high temperature.

Here, conventionally, in the field of a battery, a coating layer containing a substance such as $Li_3PO_4$ is occasionally formed on the surface of an oxide active material for the purpose of restraining a high resistive layer from being produced by the contact of an oxide active material with a sulfide solid electrolyte material. On the other hand, carbon has been conventionally used for the anode active material. It is recognized that carbon is high in stability and does not substantially react with a sulfide solid electrolyte material at the temperature during the ordinary use of a battery (such as 80° C. or less) regardless of charge state and discharge state. Under such recognition, a coating layer is not daringly formed on the surface of the anode active material having carbon as the main component. Also, a coating layer hinders ion conductivity and electron conduction, and operates so as to deteriorate battery performance (capacity performance and output performance). From this point, a coating layer is not daringly formed on the surface of the anode active material having carbon as the main component.

On the contrary, the present invention has found out that the active material particle and the sulfide solid electrolyte material react in the case when an all solid secondary battery is in charge state and placed at high temperature. The present invention focuses the findings and allows the improvement of heat resistance of an all solid secondary battery to be intended by daringly forming a coating layer on the surface of the active material particle having carbon as the main component.

Incidentally, a coating material described in Patent Literature 1 is amorphous carbon and contains carbon. Thus, in the case when the anode active material of Patent Literature 1 is used for an all solid secondary battery together with the sulfide solid electrolyte material, carbon in the coating layer will be charged when charging. As a result, the coating layer itself reacts with the sulfide solid electrolyte material, so that the coating material does not contribute to the improvement of heat resistance of an all solid secondary battery (the improvement of safety of the battery).

It has been conventionally recognized that an all solid state battery is safer than a liquid battery. Also, generally, an all solid state battery is low in battery performance as compared with a liquid battery. Thus, the present situation is such that the studies for safety of an all solid state battery are not sufficiently made. On the other hand, battery performance of an all solid state battery has been improving day by day, so that the studies on its safety are required.

1. Active Material Particle

An active material particle used for the present invention comprises carbon as the main component.

"An active material particle comprises carbon as the main component" signifies that the molar ratio or weight ratio of carbon is the largest with respect to all components of the active material particle. The ratio of carbon contained in the active material particle is preferably 50% by mol or more, preferably 60% by mol or more, more preferably 70% by mol or more. Also, the ratio of carbon contained in the active material particle is preferably 50% by weight or more, preferably 60% by weight or more, more preferably 70% by weight or more. Also, the active material particle may comprise only carbon, or carbon and other components, but preferably only carbon.

Examples of carbon used for the active material particle include graphite. Examples of graphite include highly oriented pyrolytic graphite (HOPG), natural graphite and artificial graphite.

Also, examples of carbon include mesocarbon microbeads (MCMB), hard carbon, soft carbon, carbon fiber and carbon black.

The shape of the active material particle is preferably a spherical shape such as a perfectly spherical shape and an elliptically spherical shape. Also, the average particle diameter ($D_{50}$) thereof is preferably, for example, within a range of 1 nm to 100 μm, above all, within a range of 10 nm to 30 μm.

2. Coating Layer

A coating layer used for the present invention is formed on the surface of the active material particle and contains $Li_xPO_y$ ($2 \leq x \leq 4$, $3 \leq y \leq 5$). The ratio of $Li_xPO_y$ contained in the coating layer is preferably 50% by mol or more, preferably 60% by mol or more, more preferably 70% by mol or more. Also, the ratio of $Li_xPO_y$ contained in the coating layer is preferably 50% by weight or more, preferably 60% by weight or more, more preferably 70% by weight or more.

The coating layer prevents the active material particle and a sulfide solid electrolyte material from contacting to restrain both of them from reacting with each other.

Examples of a material used for the coating layer include $Li_xPO_y$ ($2 \leq x \leq 4$, $3 \leq y \leq 5$). "x" is ordinarily 2 or more, preferably 2.5 or more. Also, "x" is ordinarily 4 or less, preferably 3.5 or less. Also, "y" is ordinarily 3 or more, preferably 3.5 or more. Also, "y" is ordinarily 5 or less, preferably 4.5 or less. The material used for the coating layer is preferably $Li_3PO_4$ in particular.

The thickness of the coating layer may be a thickness such as to allow the active material particle and the sulfide solid electrolyte material to be restrained from reacting with each other, and is, for example, preferably within a range of 0.1 nm to 100 nm, more preferably within a range of 1 nm to 20 nm. The reason therefor is that too thin coating layer brings a possibility that the active material particle and the sulfide solid electrolyte material react with each other, whereas too thick coating layer brings a possibility that ion conductivity and electron conduction deteriorate. Incidentally, examples of a measuring method for the thickness of the coating layer include transmission electron microscope (TEM).

The coverage factor of the coating layer on the surface of the active material particle is preferably high; specifically, preferably 50% or more, more preferably 80% or more. Also, the coating layer may cover the whole surface of the cathode active material. Incidentally, examples of a measuring method for the coverage factor of the coating layer include transmission electron microscope (TEM) and X-ray photoelectron spectroscopy (XPS).

Examples of a forming method for the coating layer include an evaporation method. The evaporation method may be a PVD method or a CVD method, preferably a PVD method. Examples of the PVD method include a sputtering method, a PLD method and a vacuum evaporation method, preferably a sputtering method, more preferably a barrel-sputtering method.

Also, examples of a target of the coating layer in a sputtering method include $Li_xPO_y$ ($2 \leq x \leq 4$, $3 \leq y \leq 5$) described above.

3. Anode Active Material

An example of the average particle diameter ($D_{50}$) of the anode active material of the present invention is within a range of 1 nm to 100 μm, above all, preferably within a range of 10 nm to 30 μm.

Also, the anode active material of the present invention is preferably used so as to contact with the sulfide solid electrolyte material. Also, the anode active material is preferably used for an all solid secondary battery containing the sulfide solid electrolyte material, more preferably used for a lithium all solid secondary battery.

B. All Solid Secondary Battery

Figure 2:
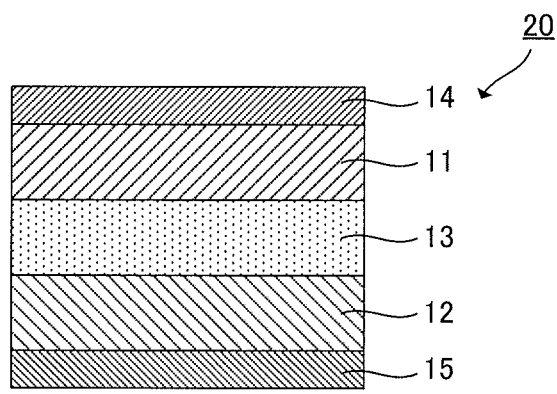
FIG. 2 is a schematic cross-sectional view showing an example of an all solid secondary battery of the present invention.

FIG. 2 is a schematic cross-sectional view showing an example of the all solid secondary battery of the present invention.

An all solid secondary battery 20 of the present invention comprises a cathode active material layer 11 containing a cathode active material, an anode active material layer 12 containing an anode active material, and a solid electrolyte layer 13 formed between the cathode active material layer 1 and the anode active material layer 12, containing a sulfide solid electrolyte material. The all solid secondary battery 20 ordinarily comprises a cathode current collector 14 which collects current of the cathode active material layer 11 and an anode current collector 15 which collects current of the anode active material layer 12. Also, the present invention has a characteristic such that the anode active material is an anode active material explained in the item of "A. Anode active material" described above.

According to the present invention, the all solid secondary battery with heat resistance improved may be obtained for the reason that the anode active material layer contains the anode active material described above.

Each constitution of the all solid secondary battery of the present invention is hereinafter described.

1. Anode Active Material Layer

The anode active material layer used for the present invention contains the anode active material in "A. Anode active material" described above. The details of the anode active material used for the present invention are described above; therefore, the description herein is omitted.

The content of the anode active material in the anode active material layer is not particularly limited but is, for example, preferably within a range of 40% by weight to 99% by weight.

The anode active material layer preferably contains a sulfide solid electrolyte material except the anode active material. Examples of the sulfide solid electrolyte material include such that having Li ion conductivity. Examples of the sulfide solid electrolyte material include LiI—$Li_2S$—$SiS_2$, LiI—$Li_2S$—$P_2O_5$, LiI—$Li_3PO_4$—$P_2S_5$, $Li_2S$—$P_2S_5$, LiI—$Li_3PS_4$, LiI—LiBr—$Li_3PS_4$, $Li_3PS_4$, $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (provided that "m" and "n" are a positive number and Z is any one of Ge, Zn and Ga.), $Li_2S$—$GeS_2$, $Li_2S$—$SiS_2$—$Li_3PO_4$, and $Li_2S$—$SiS_2$—$Li_xMO_y$ (provided that "x" and "y" are a positive number and M is any one of P, Si, Ge, B, Al, Ga and In). Incidentally, the description of "$Li_2S$—$P_2S_5$" signifies the sulfide solid electrolyte material obtained by using a raw material composition containing $Li_2S$ and $P_2S_5$, and other descriptions signify likewise.

The sulfide solid electrolyte material may have $Li_3PS_4$ skeleton for example, and also may have $Li_4P_2S_7$ skeleton or $Li_4P_2S_6$ skeleton. Examples of the sulfide solid electrolyte material having the $Li_3PS_4$ skeleton include LiI—$Li_3PS_4$, LiI—LiBr—$Li_3PS_4$ and $Li_3PS_4$. Also, examples of the sulfide solid electrolyte material having the $Li_4P_2S_7$ skeleton include $Li_7P_3S_{11}$. Also, LGPS represented by $Li_{(4-x)}Ge_{(1-x)}P_xS_4$ ("x" satisfies 0<x<1) may be used as the sulfide solid electrolyte material as an example.

The sulfide solid electrolyte material in the present invention is preferably a sulfide solid electrolyte material containing a P element, more preferably a material having $Li_2S$—$P_2S_5$ as the main component. In addition, the sulfide solid electrolyte material may contain halogen (F, Cl, Br and I).

Also, in the case where the sulfide solid electrolyte material is of an $Li_2S$—$P_2S_5$ base, the ratio of $Li_2S$ and $P_2S_5$ is preferably at molar ratio within a range of $Li_2S$:$P_2S_5$=50:50 to 100:0, above all, preferably within a range of $Li_2S$:$P_2S_5$=70:30 to 80:20.

Also, the sulfide solid electrolyte material may be sulfide glass, crystallized sulfide glass, or a crystalline material obtained by a solid phase method. Incidentally, the sulfide glass may be obtained by performing mechanical milling (such as ball mill) for a raw material composition, for example. Also, the crystallized sulfide glass may be obtained by heat-treating the sulfide glass at a temperature of crystallization temperature or higher, for example. Also, ion conductance (such as Li ion conductance) at normal temperature (25° C.) of the sulfide solid electrolyte material is, for example, preferably $1 \times 10^{-5}$ S/cm or more, more preferably $1 \times 10^{-4}$ S/cm or more. The ion conductance may be measured by an alternating current impedance method.

Examples of the shape of the sulfide solid electrolyte material in the present invention include a particulate shape such as a perfectly spherical shape and an elliptically spherical shape, and a thin-film shape. In the case where the sulfide solid electrolyte material is in the particulate shape, the average particle diameter ($D_{50}$) thereof is not particularly limited but preferably 40 μm or less, more preferably 20 μm or less, and most preferably 10 μm or less. On the other hand, the average particle diameter is preferably 0.01 μm or more, more preferably 0.1 μm or more. Incidentally, the average particle diameter may be determined by a granulometer, for example.

The content of the sulfide solid electrolyte material in the anode active material layer used for the present invention is, for example, preferably within a range of 1% by weight to 90% by weight, more preferably within a range of 10% by weight to 80% by weight.

The anode active material layer in the present invention may further contain at least one of a conductive material and a binder except for the anode active material and the sulfide solid electrolyte material described above. Examples of the conductive material include carbon materials such as acetylene black, Ketjen Black and carbon fiber (VGCF), nickel, aluminum, and SUS. Also, the anode active material layer may not contain the conductive material. Examples of the binder include fluorine-containing binders such as polyvinylidene fluoride (PVdF) and polytetrafluorethylene (PTFE), styrene-butadiene rubber (SBR), butadiene rubber (BR), and acrylate butadiene rubber (ABR). The thickness of the anode active material layer varies with the constitution of an intended all solid secondary battery, but is preferably within a range of 0.1 μm to 1000 μm, for example.

The ratio between the capacity of the anode active material layer and the capacity of the cathode active material layer is preferably such that the capacity of the anode active material layer is larger than the capacity of the cathode active material layer. The reason therefor is to allow a short circuit to be restrained from occurring. The capacity ratio is, for example, within a range of cathode active material layer:anode active material layer=1:1.01 to 1:5. Also, the capacity ratio may be cathode active material layer:anode active material layer=1:2, for example.

2. Solid Electrolyte Layer

The solid electrolyte layer used for the present invention contains the sulfide solid electrolyte material.

Specific examples of the sulfide solid electrolyte material are the same as the sulfide solid electrolyte material described above; therefore, the description herein is omitted.

The content of the sulfide solid electrolyte material in the solid electrolyte layer is, for example, preferably within a range of 10% by weight to 100% by weight, more preferably within a range of 50% by weight to 100% by weight.

The solid electrolyte layer may contain a binder except the materials described above. The binder is the same as the contents described above; therefore, the description herein is omitted. The thickness of the solid electrolyte layer varies with the constitution of an intended all solid secondary battery, but is, for example, preferably within a range of 0.1 μm to 1000 μm, more preferably within a range of 0.1 μm to 300 μm.

3. Cathode Active Material Layer

The cathode active material layer in the present invention is a layer containing at least the cathode active material, and may contain at least one of a solid electrolyte material, a conductive material and a binder as required. Incidentally, the conductive material and the binder are the same as the contents described above; therefore, the description herein is omitted.

Kinds of the cathode active material are properly selected in accordance with kinds of the all solid secondary battery, and examples thereof include an oxide active material and a sulfide active material. Examples of the oxide active material include rock salt bed type active materials such as $LiCoO_2$, $LiMnO_2$, $LiNiO_2$, $LiVO_2$ and $LiNi_{1/3}Co_{1/3}Mn_{1/3}O_2$, spinel type active materials such as $LiMn_2O_4$ and $LiNi_{0.5}Mn_{1.5}O_4$, olivine type active materials such as $LiFePO_4$ and $LiMnPO_4$, and Si-containing active materials such as $Li_2FeSiO_4$ and $Li_2MnSiO_4$. Also, examples of the oxide active material except the above include $Li_4Ti_5O_{12}$.

Examples of the shape of the cathode active material include a particulate shape and a thin-film shape. In the case the cathode active material is in a particulate shape, the average particle diameter thereof ($D_{50}$) is, for example, preferably within a range of 1 nm to 100 μm, above all, preferably within a range of 10 nm to 30 μm.

The content of the cathode active material in the cathode active material layer is not particularly limited but is, for example, preferably within a range of 40% by weight to 99% by weight.

The cathode active material layer may contain a sulfide solid electrolyte material except the cathode active material. Specific examples of the sulfide solid electrolyte material are the same as the sulfide solid electrolyte material described above; therefore, the description herein is omitted. The content of the sulfide solid electrolyte material in the cathode active material layer used for the present invention is, for example, preferably within a range of 1% by weight to 90% by weight, more preferably within a range of 10% by weight to 80% by weight.

The thickness of the cathode active material layer in the present invention varies with the constitution of an intended all solid secondary battery, but is preferably within a range of 0.1 μm to 1000 μm, for example.

4. Other Constitutions

Also, the all solid secondary battery of the present invention has at least the cathode active material layer, anode active material layer and solid electrolyte layer, ordinarily further has a cathode current collector for collecting the cathode active material and an anode current collector for collecting the anode active material. Examples of a material for the cathode current collector include SUS, aluminum, nickel, iron, titanium and carbon. On the other hand, examples of a material for the anode current collector include SUS, copper, nickel and carbon. Also, the all solid secondary battery of the present invention may have a battery case and an exterior body.

5. All Solid Secondary Battery

The all solid secondary battery of the present invention is preferably a lithium all solid secondary battery, for example. In the case where the all solid secondary battery of the present invention is used as a car-mounted battery, examples of a vehicle as an object include an electric automobile mounted with a battery but not an engine, and a hybrid automobile mounted with both a battery and an engine. Examples of the shape of the all solid secondary battery of the present invention include a coin shape, a laminate shape, a cylindrical shape and a rectangular shape.

Incidentally, the present invention is not limited to the embodiments. The embodiments are exemplification, and any is included in the technical scope of the present invention if it has substantially the same constitution as the technical idea described in the claim of the present invention and offers similar operation and effect thereto.

EXAMPLES

The present invention is described more specifically by showing examples hereinafter.

Example (Production of Sulfide Solid Electrolyte Material)

Lithium sulfide ($Li_2S$), phosphorus pentasulfide ($P_2S_5$) and lithium iodide (LiI) were used as starting materials. Next, $Li_2S$ and $P_2S_5$ were weighed in a glove box under an Ar atmosphere (dew-point temperature: $-70°$ C.) so as to be a molar ratio of $75Li_2S\cdot25P_2S_5$ ($Li_3PS_4$, ortho-composition). Next, LiI was weighed so as to be 10 mol %. The weight of 2 g of this mixture was projected into a vessel of planetary ball mill (45 cc, made of $ZrO_2$), dehydrated heptane (a moisture amount of 30 ppm or less, 4 g) was projected thereinto, and a $ZrO_2$ ball ($\phi=5$ mm, 53 g) was projected thereinto to hermetically seal the vessel completely (Ar atmosphere). This vessel was mounted on a planetary ball mill machine (P7™ manufactured by FRITSCH JAPAN CO, LTD.) to perform mechanical milling at the number of soleplate revolutions of 500 rpm for 1-hour and 15-minute pause forty times. Thereafter, the obtained test sample was dried on a hot plate so as to remove the heptane to obtain a sulfide solid electrolyte material. The composition of the synthesized sulfide solid electrolyte material was $10LiI\cdot90(0.75Li_2S\cdot0.25P_2S_5)$.

The synthesized sulfide solid electrolyte material was atomized and crystallized by the following method to thereby obtain a sulfide solid electrolyte material with an average particle diameter of 3.1 nm.

The sulfide solid electrolyte material, dehydrated heptane (manufactured by KANTO CHEMICAL CO., INC.) and dibutyl ether were prepared so that a total weight thereof was 10 g and the ratio of the weight of the sulfide solid electrolyte material occupied in the total weight was 10% by weight. The sulfide solid electrolyte material, the dehydrated heptane, the dibutyl ether and 40 g of a $ZrO_2$ ball ($\phi$=1 mm) were projected into a 45-ml $ZrO_2$ pot, and then the pot was hermetically sealed completely (Ar atmosphere). This pot was mounted on a planetary ball mill machine (P7™ manufactured by FRITSCH JAPAN CO, LTD.) and subjected to wet mechanical milling treatment at the number of rotation/revolution of 150 rpm for 20 hours to thereby grind and atomize the sulfide solid electrolyte material.

The weight of 1 g of the atomized sulfide solid electrolyte material in atomization was disposed on a petri dish made of aluminum and retained on a hot plate heated to 180° C. over 2 hours to thereby crystallize the atomized sulfide solid electrolyte material.

Production of Cathode Mixture

A composition produced by dissolving equimolar $LiOC_2H_5$ and $Nb(OC_2H_5)_5$ in an ethanol solvent was spray-coated on the surface of $LiNi_{1/3}Co_{1/3}Mn_{1/3}O_2$ (manufactured by Nichia Corporation) by using a tumbling fluidized bed coating apparatus (SFP-01™, manufactured by Powrex Corp.). Thereafter, the coated $LiNi_{1/3}Co_{1/3}Mn_{1/3}O_2$ was heat-treated at 350° C. under the atmospheric pressure over 1 hour to thereby form a layer of $LiNbO_3$ (coating layer) on the surface of $LiNi_{1/3}Co_{1/3}Mn_{1/3}O_2$ (active material) and produce a cathode active material. The average particle diameter ($D_{50}$) of the cathode active material was 5 μm. Weighed were 52 g of the obtained cathode active material, 17 g of the sulfide solid electrolyte material, 1 g of vapor growth carbon fiber (VGCF™ (registered trademark)) as a conductive material, 15 g of dehydrated heptane (manufactured by KANTO CHEMICAL CO., INC.) and 0.4 g of PVDF (binder). Each component was sufficiently mixed to obtain cathode mixture slurry. The cathode mixture slurry was coated and dried on an Al foil to obtain a cathode mixture. The cathode mixture was scraped and collected from the Al foil.

(Production of Anode Mixture)

An anode active material was obtained in the manner which $Li_3PO_4$ was made into a film on the surface of graphite (manufactured by Mitsubishi Chemical Corporation) by using a barrel-sputtering method to form a coating layer with an average thickness of 10 nm.

Weighed were 36 g of the anode active material, 25 g of the sulfide solid electrolyte material and 0.5 g of PVDF (binder). Each component was sufficiently mixed to obtain anode mixture slurry. The anode mixture slurry was coated and dried on a Cu foil to obtain an anode mixture. The anode mixture was scraped and collected from the Cu foil.

(Production of Solid Electrolyte Mixture)

The sulfide solid electrolyte material and a binder (ABR) were mixed at the ratio of sulfide solid electrolyte material: ABR=98:2 (volume ratio) to obtain a solid electrolyte mixture (separator).

(Production of DSC Measurement Sample Portion)

Weighed were 100 mg of the cathode mixture and 100 mg of the solid electrolyte mixture. Also, 80 mg of the anode mixture was weighed. The amount of the anode mixture was adjusted so that the after-mentioned ratio of the capacity of the cathode active material layer and the capacity of the anode active material layer became cathode active material layer:anode active material layer=1:1.1 (FIGS. 3(*a*-1), (*a*-2) and (*a*-3)).

Figure 3:
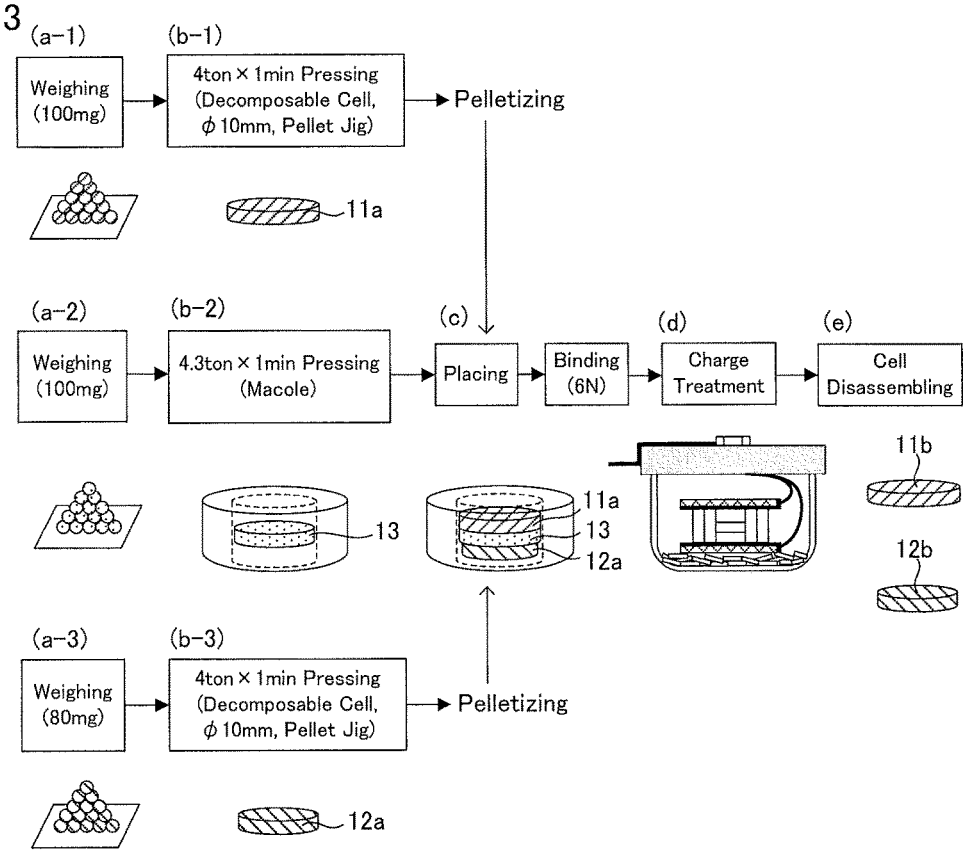
FIG. 3 is a flow chart showing a preparing method of DSC measurement of examples and comparative examples.

The cathode mixture was put in a decomposable pellet jig of φ 10 mm, and pressed at 4 ton for 1 minute to obtain a cathode mixture layer 1*a* (FIG. 3(*b*-1)). Also, the sulfide solid electrolyte material was put in a case (macole), and pressed at 4.3 ton for 1 minute to obtain a solid electrolyte layer 3 (FIG. 3(*b*-2)). The anode mixture was pressed in the same manner as the cathode mixture to obtain an anode mixture layer 2*a* (FIG. 3(*b*-3)). The cathode mixture layer 1a, the solid electrolyte layer 3 and the anode mixture layer 2*a* were placed in the case and bound at 6 N to obtain a cell (FIG. 3(*c*)). Also, the Al foil and the Cu foil were disposed as a cathode current collector and an anode current collector respectively to obtain an evaluation battery.

The obtained evaluation battery was subject to charge treatment and charged up to SOC 100% (FIG. 3(*d*)). The charge conditions were constant-current-charge constant-current-discharge (CC-CV charge), charging current rate: 1/30 C charge, charging extinction voltage: 4.55 V, temperature: 25° C., atmosphere: Ar.

After the charge treatment, the evaluation battery was disassembled to obtain a charge cathode mixture 1*b* and a charge anode mixture 2*b* (a test sample) (FIG. 3(*e*)).

Comparative Example

An evaluation battery and a charge anode mixture were obtained in the same manner as Example except for using graphite (manufactured by Mitsubishi Chemical Corporation) not having a coating layer as the anode active material.

The following Table 1 shows the constitution of the evaluation battery of Example and Comparative Example.

TABLE 1

| | | Examples | Comparative Examples |
|---|---|---|---|
| | Cathode Current Collector | Al foil | Al foil |
| Cathode Active Material Layer | Cathode Active Material | $LiNi_{1/3}Co_{1/3}Mn_{1/3}O_2$ | $LiNi_{1/3}Co_{1/3}Mn_{1/3}O_2$ |
| | Solid Electrolyte | Sulfide Solid Electrolyte Material | Sulfide Solid Electrolyte Material |
| | Binder | PVDF | PVDF |
| | Conductive Material | VGCF | VGCF |
| Solid Electrolyte Material Layer | Solid Electrolyte | Sulfide Solid Electrolyte Material | Sulfide Solid Electrolyte Material |
| | Binder | ABR | ABR |
| Anode Active Material Layer | Anode Active Material | Carbon + Coating Layer | Carbon |
| | Solid Electrolyte | Sulfide Solid Electrolyte Material | Sulfide Solid Electrolyte Material |
| | Binder | PVDF | PVDF |
| | Conductive Material | — | — |
| | Anode Current Collector | Cu foil | Cu foil |

[Evaluations]

DSC of the charge anode mixture of Example and Comparative Example was measured. The measurement conditions were rate of temperature rise: 10° C./min, Ar atmosphere, measured temperature: 50° C. to 500° C., pan to be used: SUS pan (gold plating). The results are shown in FIG. 4.

Figure 4:
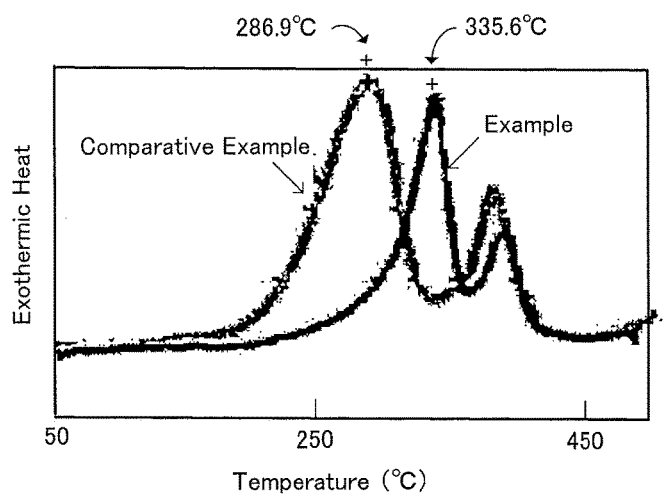
FIG. 4 is a result of DSC measurement of examples and comparative examples.

As shown in FIG. 4, in Comparative Example, an exothermic peak was detected at 286.9° C. On the other hand, in Example, an exothermic peak was detected at 335.6° C. Therefore, it was confirmed that heat resistance of a battery was improved by approximately 50° C. by forming a coating layer on the active material particle.

REFERENCE SIGNS LIST 1 active material particle
2 coating layer
10 anode active material
11 cathode active material layer
12 anode active material layer
13 solid electrolyte layer
14 cathode current collector
15 anode current collector
20 all solid secondary battery

What is claimed is:

1. An anode active material comprising:
   an active material particle having carbon as a main component; and
   a coating layer containing $Li_xPO_y$ ($2 \leq x \leq 4$, $3 \leq y \leq 5$) and formed on a surface of the active material particle,
   wherein a ratio of the $Li_xPO_y$ contained in the coating layer is 50 mol % or more.

2. An all solid secondary battery comprising a cathode active material layer containing a cathode active material, an anode active material layer containing an anode active material, and a solid electrolyte layer containing a sulfide solid electrolyte material and formed between the cathode active material layer and the anode active material layer;
   wherein the anode active material is the anode active material according to claim 1.

3. An anode active material comprising:
   an active material particle having carbon as a main component; and
   a coating layer containing $Li_xPO_y$ ($2 \leq x \leq 4$, $3 \leq y \leq 5$) and formed on a surface of the active material particle,
   wherein a thickness of the coating layer is in a range of 1 nm to 20 nm.

4. An all solid secondary battery comprising a cathode active material layer containing a cathode active material, an anode active material layer containing an anode active material, and a solid electrolyte layer containing a sulfide solid electrolyte material and formed between the cathode active material layer and the anode active material layer;
   wherein the anode active material is the anode active material according to claim 3.

* * * * *